(12) United States Patent
Cheng et al.

(10) Patent No.: US 11,589,197 B2
(45) Date of Patent: Feb. 21, 2023

(54) APPLICATION BASED RANGE MANAGEMENT FOR CELLULAR VEHICLE-TO-ANYTHING COMMUNICATION

(71) Applicant: QUALCOMM Incorporated, San Diego, CA (US)

(72) Inventors: Hong Cheng, Basking Ridge, NJ (US); Shailesh Patil, San Diego, CA (US); Gene Wesley Marsh, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,313

(22) Filed: Jun. 17, 2021

(65) Prior Publication Data

US 2021/0400449 A1 Dec. 23, 2021

Related U.S. Application Data

(60) Provisional application No. 63/042,410, filed on Jun. 22, 2020.

(51) Int. Cl.
*H04W 4/40* (2018.01)
*H04W 4/02* (2018.01)

(52) U.S. Cl.
CPC .............. *H04W 4/40* (2018.02); *H04W 4/023* (2013.01)

(58) Field of Classification Search
CPC ..... H04W 4/40; H04W 4/023; H04W 72/048; H04W 4/44
See application file for complete search history.

(56) References Cited

U.S. PATENT DOCUMENTS

2020/0351981 A1\* 11/2020 Kang ................ H04W 28/0278
2021/0029674 A1\* 1/2021 Uchiyama .............. H04W 4/30
(Continued)

FOREIGN PATENT DOCUMENTS

| EP | 3780793 A1 | 2/2021 |
|---|---|---|
| WO | WO-2019187562 A1 | 10/2019 |
| WO | WO-2020033089 A1 | 2/2020 |
| WO | WO-2020033422 A1 | 2/2020 |

OTHER PUBLICATIONS

International Search Report and Written Opinion—PCT/US2021/038217—ISA/EPO—dated Oct. 5, 2021.
(Continued)

*Primary Examiner* — Marcus Hammonds
(74) *Attorney, Agent, or Firm* — Campbell Chiang; Harrity & Harrity, LLP

(57) ABSTRACT

Various aspects of the present disclosure generally relate to wireless communication. In some aspects, a user equipment may obtain information indicating a set of parameters associated with a vehicle-to-anything (V2X) application; determine a range parameter based at least in part on a modification to a baseline range parameter, wherein the modification is based at least in part on the set of parameters associated with the V2X application, and wherein the baseline range parameter is associated with the service type of the V2X application; and perform a V2X communication based at least in part on the range parameter for the V2X communication. Numerous other aspects are provided.

30 Claims, 7 Drawing Sheets

(56) References Cited

U.S. PATENT DOCUMENTS

| | | | |
|---|---|---|---|
| 2021/0306824 A1* | 9/2021 | Li | H04L 1/1887 |
| 2021/0329596 A1* | 10/2021 | Freda | H04W 72/082 |
| 2022/0132491 A1* | 4/2022 | Zhang | H04W 72/048 |

OTHER PUBLICATIONS

Qualcomm Incorporated: "Physical Layer Procedures for Sidelink", 3GPP Draft, 3GPP TSG RAN WG1 #98, R1-1909257 Physical Layer Procedures for Sidelink, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 16, 2019-Aug. 30, 2019, Aug. 16, 2019 (Aug. 16, 2019), XP051765862, 17 Pages, Retrieved from the Internet: URL: http://www.3gpp.org/ftp/tsg_ran/WG1_RL1/TSGR1_98/Docs/R1-1909257.zip, [retrieved on Aug. 16, 2019], Sections 1-5, in particular 2.1.2 and 2.1.3, figures 6-7.

VIVO: "Physical Layer Procedure for NR Sidelink", 3GPP Draft, (Draft) R1-1908154, 3GPP TSG RAN WG1 Meeting #98, Physical Layer Procedure for NR Side Link, 3rd Generation Partnership Project (3GPP), Mobile Competence Centre, 650, Route Des Lucioles, F-06921 Sophia-Antipolis cedex, vol. RAN WG1, No. Prague, CZ, Aug. 26, 2019-Aug. 30, 2019, Aug. 17, 2019 (Aug. 17, 2019), XP051764773, pp. 1-20, Retrieved from the Internet: URL: http://www.3gpp.org/ftp/tsg_ran/WG1_RL1/TSGR1_98/Docs/R1-1908154.zip [retrieved on Aug. 17, 2019] The Whole Document, p. 9, Paragraph 3.5 p. 5, Case 3.

* cited by examiner

APPLICATION BASED RANGE MANAGEMENT FOR CELLULAR VEHICLE-TO-ANYTHING COMMUNICATION

CROSS-REFERENCE TO RELATED APPLICATION

This Patent Application claims priority to U.S. Provisional Patent Application No. 63/042,410, filed on Jun. 22, 2020, entitled "APPLICATION BASED RANGE MANAGEMENT FOR CELLULAR VEHICLE-TO-ANYTHING COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for application based range management for cellular vehicle-to-anything (V2X) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include determining, based at least in part on a set of parameters associated with a vehicle-to-anything (V2X) application, a range parameter for a V2X communication; and performing the V2X communication based at least in part on the range parameter.

In some aspects, a method of wireless communication, performed by a UE, may include determining a range parameter for a V2X communication by the UE, wherein the range parameter defines an asymmetric range around at least one axis relative to the UE; and performing the V2X communication in accordance with the range parameter.

In some aspects, a UE for wireless communication may include a memory and one or more processors operatively coupled to the memory. The memory and the one or more processors may be configured to determine, based at least in part on a set of parameters associated with a V2X application, a range parameter for a V2X communication; and perform the V2X communication based at least in part on the range parameter.

In some aspects, a UE for wireless communication may include a memory and one or more processors operatively coupled to the memory. The memory and the one or more processors may be configured to determine a range parameter for a V2X communication by the UE, wherein the range parameter defines an asymmetric range around at least one axis relative to the UE; and perform the V2X communication in accordance with the range parameter.

In some aspects, a non-transitory computer-readable medium may store one or more instructions for wireless communication. The one or more instructions, when executed by one or more processors of a UE, may cause the one or more processors to determine, based at least in part on a set of parameters associated with a V2X application, a range parameter for a V2X communication; and perform the V2X communication based at least in part on the range parameter.

In some aspects, a non-transitory computer-readable medium may store one or more instructions for wireless communication. The one or more instructions, when executed by one or more processors of a UE, may cause the one or more processors to determine a range parameter for a V2X communication by the UE, wherein the range parameter defines an asymmetric range around at least one axis relative to the UE; and perform the V2X communication in accordance with the range parameter.

In some aspects, an apparatus for wireless communication may include means for determining, based at least in part on a set of parameters associated with a V2X application, a range parameter for a V2X communication; and means for performing the V2X communication based at least in part on the range parameter.

In some aspects, an apparatus for wireless communication may include means for determining a range parameter for a V2X communication by the apparatus, wherein the range parameter defines an asymmetric range around at least one axis relative to the apparatus; and means for performing the V2X communication in accordance with the range parameter.

In some aspects, a method of wireless communication, performed by a UE, may include obtaining information indicating a set of parameters associated with a vehicle-to-anything (V2X) application; determining a range parameter based at least in part on a modification to a baseline range parameter, wherein the modification is based at least in part on the set of parameters associated with the V2X application, and wherein the baseline range parameter is associated with the service type of the V2X application; and performing a V2X communication based at least in part on the range parameter for the V2X communication.

In some aspects, a UE for wireless communication may include a memory and one or more processors operatively coupled to the memory. The memory and the one or more processors may be configured to obtain information indicating a set of parameters associated with a vehicle-to-anything (V2X) application; determine a range parameter based at least in part on a modification to a baseline range parameter, wherein the modification is based at least in part on the set of parameters associated with the V2X application, and wherein the baseline range parameter is associated with the service type of the V2X application; and perform a V2X communication based at least in part on the range parameter for the V2X communication.

In some aspects, a non-transitory computer-readable medium may store one or more instructions for wireless communication. The one or more instructions, when executed by one or more processors of a UE, may cause the one or more processors to obtain information indicating a set of parameters associated with a vehicle-to-anything (V2X) application; determine a range parameter based at least in part on a modification to a baseline range parameter, wherein the modification is based at least in part on the set of parameters associated with the V2X application, and wherein the baseline range parameter is associated with the service type of the V2X application; and perform a V2X communication based at least in part on the range parameter for the V2X communication.

In some aspects, an apparatus for wireless communication may include means for obtaining information indicating a set of parameters associated with a vehicle-to-anything (V2X) application; means for determining a range parameter based at least in part on a modification to a baseline range parameter, wherein the modification is based at least in part on the set of parameters associated with the V2X application, and wherein the baseline range parameter is associated with the service type of the V2X application; and means for performing a V2X communication based at least in part on the range parameter for the V2X communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
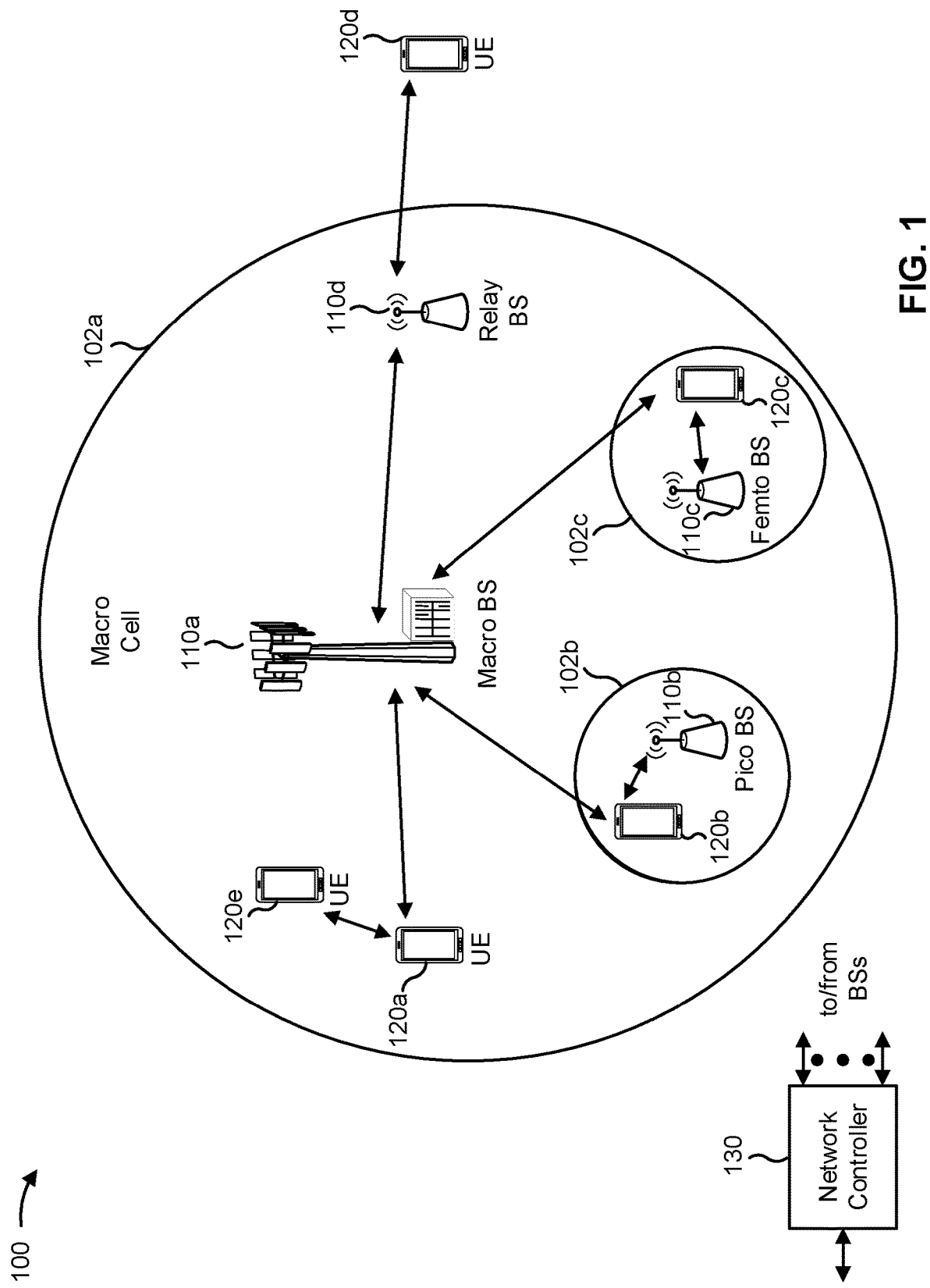
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
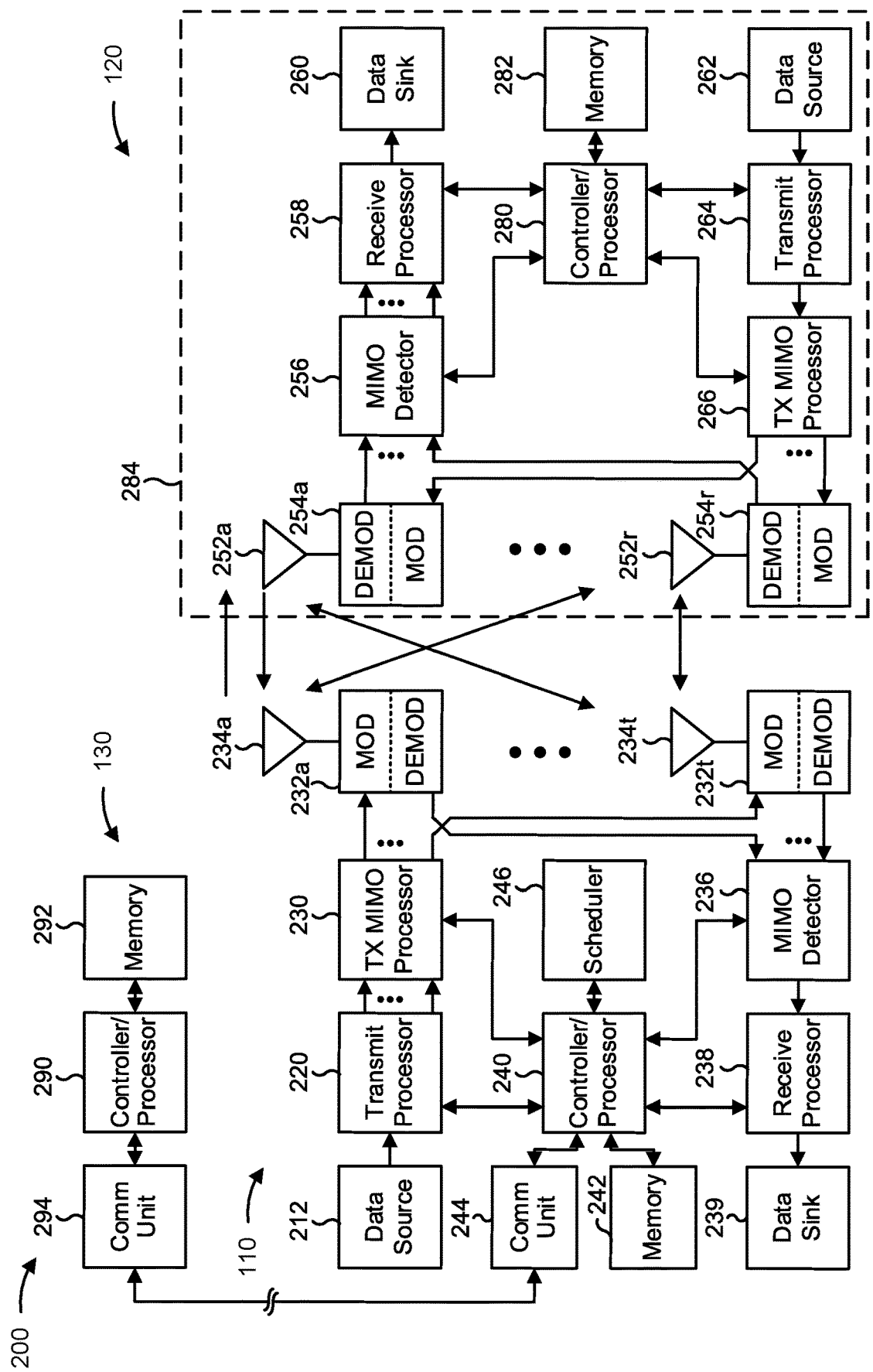
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with V2X application determination of a range parameter, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining, based at least in part on a set of parameters associated with a V2X application, a range parameter for a V2X communication; means for performing the V2X communication based at least in part on the range parameter; means for determining a range parameter for a V2X communication by the UE, wherein the range parameter defines an asymmetric range around at least one axis relative to the UE; means for performing the V2X communication in accordance with the range parameter; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
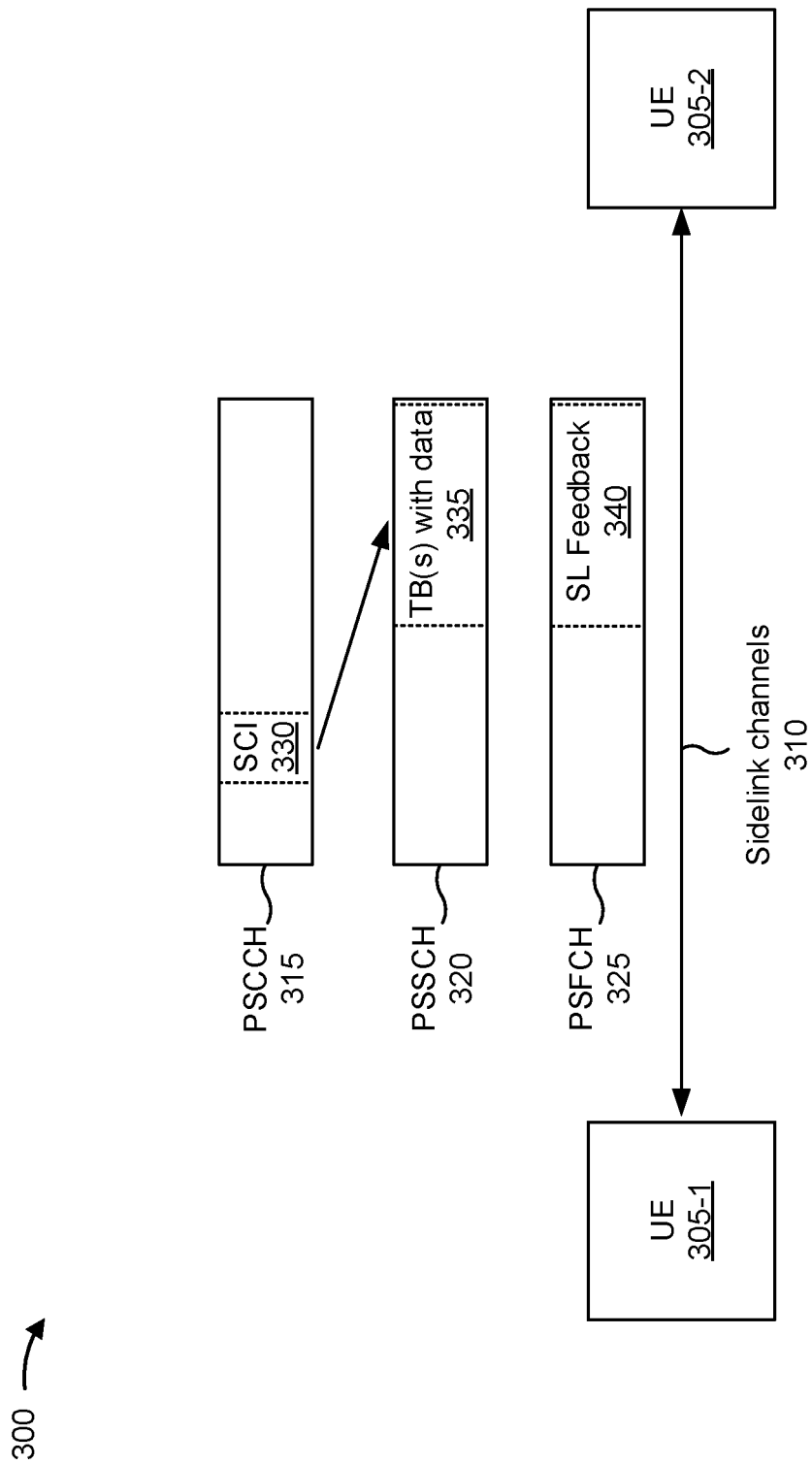
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. In some aspects, the SCI may indicate a range for a communication, and processing of the communication at a receiver UE or device may be based at least in part on the range. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
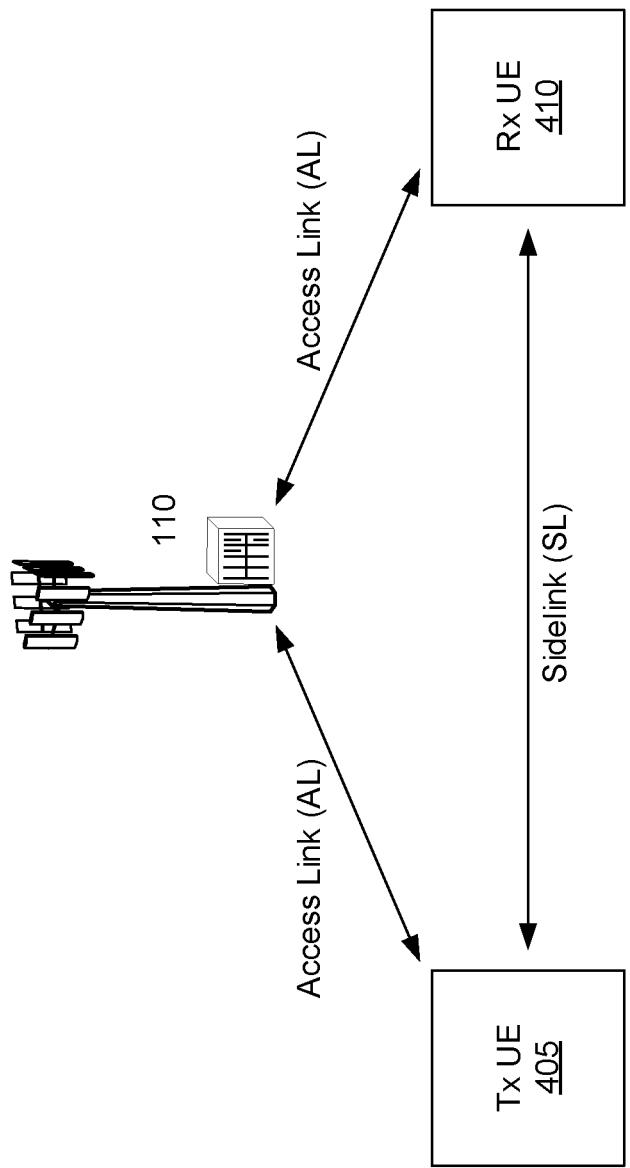
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Some sidelink communication systems (e.g., V2X systems and/or the like) provide a range-based quality of service (QoS) mechanism. For example, a transmitter UE may provide a range parameter (e.g., in SCI associated with a communication). When a receiver UE is not within the range specified by the range parameter, a communication from the transmitter UE may be treated as a best-effort communication. A lower layer of the receiver UE (e.g., a physical or medium access control layer) may use the range parameter to determine the corresponding packet handling (e.g., hybrid automatic repeat request transmission and/or the like) to achieve a QoS level indicated by sidelink QoS parameters. Thus, setting an appropriate range can reduce retransmissions, thereby saving resources, and can improve the performance of transmissions with regard to delays and/or the like.

In some aspects, the range parameter may be statically configured. For example, the range parameter may be based at least in part on a default value mapped to a V2X service type associated with a V2X application that generates or triggers a communication. In some aspects, the V2X service type can be a PSID (Provider Service ID) or an ITS-AID (Intelligent Transportation Systems Application Identifier). However, a statically configured range parameter may not be appropriate in all situations, even within the situations applicable to a single V2X application. For example, a coordinated driving service V2X application may encounter different types of coordinated operations, different driving environments, different vehicle speeds, and so on, such that a single range parameter may prove inflexible and ill-adapted to some scenarios. Similarly, a sensor sharing service V2X application may encounter different speed limits, different message contents, different maneuvers, and different distances associated with such maneuvers, such that a single range parameter may prove inflexible and ill-adapted to some scenarios.

Furthermore, in some aspects, a range for a communication that is centered on the UE and that is symmetrical may not be ideal for some applications. For example, for sensor sharing, a vehicle behind an ego vehicle (e.g., a vehicle that includes a UE determining a range parameter and transmitting a communication) may be more relevant for the purpose of some communications than a vehicle in front of an ego vehicle. As another example, for intersection coordination, vehicles yet to enter an intersection may be more important to intersection coordination operations than vehicles that have already exited the intersection. However, the range defined by the range parameter may be a circle centered on the UE, such that less important vehicles and more important vehicles are treated equally. This may lead to sub-optimal resource allocation and increased resource usage at less important vehicles (and UEs associated with the less important vehicles) while more important vehicles may be excluded from a symmetrical range.

Some techniques and apparatuses described herein enable a V2X application to provide a range parameter for a transmission. For example, the V2X application may determine the range parameter based at least in part on a set of parameters. The set of parameters may include parameters associated with the V2X application, such as a set of parameters associated with a coordinated driving service, a set of parameters associated with sensor sharing, and/or the like. In some aspects, the service type of the V2X application may be one of the parameters used to determine the range parameter. In some aspects, the service type of the V2X application may not be one of the parameters used to determine the range parameter. In this way, a V2X application may determine an appropriate range parameter to be used for a communication, which improves efficiency of the communication, improves resource utilization, and conserves communication resources.

Additionally, or alternatively, techniques and apparatuses described herein provide an asymmetric range parameter. For example, the asymmetric range parameter may be implemented by modifying a transmitter UE zone identifier, or by defining a multiple-value range parameter (e.g., with two or more range values) such that an asymmetric range can be indicated. In this way, the range of a communication can be modified such that more important UEs (and vehicles) are within the range, while less important UEs (and vehicles) are excluded from the range. Thus, coverage of more important UEs is improved, while resource usage associated with communicating with less important UEs is reduced.

Figure 5:
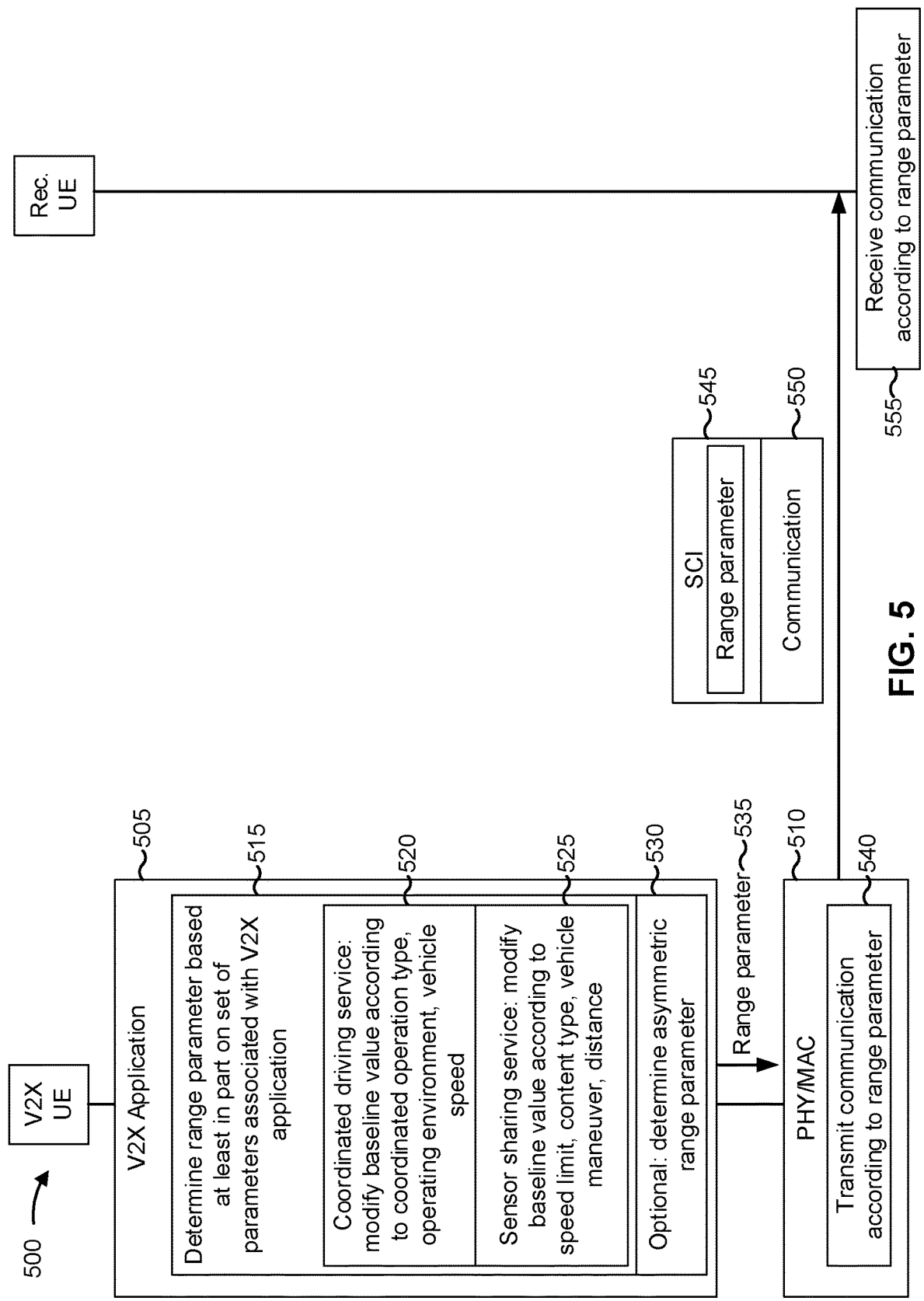
FIG. 5 is a diagram illustrating an example of vehicle to anything (V2X) application determination of a range parameter, in accordance with the present disclosure.

FIG. 5 is a diagram illustrating an example 500 of V2X application determination of a range parameter, in accordance with the present disclosure. As shown, example 500 includes a V2X UE and a recipient (Rec.) UE (e.g., UE 120, UE 305, UE 405, and/or the like). As further shown, the V2X UE is associated with a V2X application 505 (which may be implemented in an application layer of the V2X UE) and a physical/medium access control (PHY/MAC) layer. The PHY/MAC layer may handle transmission and reception according to a range parameter provided and/or modified by the V2X application 505, as described below.

As shown by reference number 515, the V2X application 505 may determine a range parameter based at least in part on a set of parameters associated with the V2X application 505. Generally, the V2X application 505 may be associated with a baseline (e.g., default) range parameter, and may determine a modification to the range parameter based at least in part on the set of parameters. The determination of the range parameter for different V2X applications 505 is shown by reference numbers 520 and 525. In some examples below, specific range values for the range parameter are provided. These range values are provided by way of example only, and are not limiting of the range values that can be used. As described below, the set of parameters may include a vehicle speed. Additionally, or alternatively, the set of parameters may include a service type of the V2X application, as described elsewhere herein.

The V2X application may obtain information indicating the set of parameters. In some aspects, the V2X application may obtain (e.g., receive, retrieve) one or more of the set of parameters from the PHY/MAC layer. For example, the PHY/MAC layer may determine and provide one or more of the set of parameters. As another example, the PHY/MAC layer may receive, from another UE, information indicating a parameter, and may provide the information indicating the parameter to the V2X application. Additionally, or alternatively, the V2X application may obtain (e.g., receive, retrieve) sensor information indicating one or more of the set of parameters. For example, the sensor information may be received from a sensor of the V2X UE or may be signaled from another UE (e.g., the recipient UE or another UE).

As shown by reference number 520, in some aspects, the V2X application 505 may be a coordinated driving service V2X application (e.g., the service type may indicate the coordinated driving service V2X application). A coordinated driving service V2X application may handle signaling between V2X UEs (e.g., transmitter UEs and recipient UEs) to support coordinated driving, such as coordinated lane changes, platooning, intersection coordination, coordinated car parking operations, and so on. As further shown, the V2X application 505 may modify a baseline range value associated with the coordinated driving service based at least in part on a set of parameters. In one example, the baseline range may be approximately 150 meters (m). If the V2X application 505 determines that none of the parameters described in connection with reference numbers 520 and 525 indicate that the baseline range is to be modified, then the V2X application 505 may use the baseline range value as the range parameter.

In some aspects, the V2X application 505 may modify the baseline range value based at least in part on a coordinated operation service type (e.g., the service type may indicate the coordination operation service type for the V2X application 505). For example, the V2X application 505 may determine a range parameter of 100 m for a lane change coordinated operation service type, a range parameter of 200 m for a platooning coordinated operation service type, or a range parameter of 50 m for an intersection crossing coordinated operation service type or a coordinated car park operation type. In some aspects, the V2X application 505 may modify the baseline range value based at least in part on an operating environment. The operating environment may be associated with an environment type. For example, for a passing maneuver, passing on a divided highway environment type may involve a shorter range than on a two-lane road environment type, since a two-lane road may involve more or more difficult maneuver steps than a divided highway. Thus, the V2X application may determine a longer-range parameter for a two-lane road environment type than for a divided highway environment type. In some aspects, the V2X application 505 may modify the baseline range value based at least in part on a vehicle speed associated with the V2X UE. For example, the V2X application 505 may determine a shorter-range parameter for a lower-speed vehicle than for a higher-speed vehicle. More particularly, the V2X application may determine a range parameter of 50 m for a vehicle travelling at 25 miles per hour (mph). As used herein, "vehicle speed" can refer to a speed (e.g., a time rate of movement, expressed in terms of distance per time unit) or a velocity (e.g., a speed and a direction of travel).

As shown by reference number 525, in some aspects, the V2X application 505 may be a sensor sharing service V2X application (e.g., the service type may indicate a sensor sharing service for the V2X application). A sensor sharing service V2X application may handle signaling between V2X UEs (e.g., transmitter UEs and recipient UEs) to support sensor sharing, such as for signaling to locate other vehicles/UEs, information regarding hazards or other entities present on the road, a maneuver performed by a car (e.g., based at least in part on a road curvature, an evasive maneuver, and/or the like), and so on.

As further shown, the V2X application 505 may modify a baseline range value associated with the sensor sharing service based at least in part on a set of parameters. In one example, the baseline range value may be approximately 250 m, which may provide a gap of at least approximately 4 seconds even at high vehicle speed. In some aspects, the V2X application 505 may modify the baseline range value based at least in part on a speed limit of a road. For example, in a region of a road associated with a 65 mph speed limit, the range value of the range parameter may be adjusted to 120 m. In a region of the road associated with a 25 mph speed limit, the range value of the range parameter may be adjusted to 50 m. Thus, a shorter range parameter is provided in regions of the road associated with a lower speed limit, which improves efficiency of resource utilization in scenarios where longer range values may not be particularly beneficial.

In some aspects, the V2X application 505 may modify the baseline range value based at least in part on a content type of the communication. For example, in some cases, the communication may indicate the presence of an object, such as a hazard or a pedestrian. If the object is a small or unharmful entity, the V2X application may determine a shorter range value. If the object is a large object or an object that is important or dangerous (e.g., a large animal, a pedestrian, a large pothole, and/or the like), then the V2X application may determine a longer range value, which provides improved reliability in warning recipient UEs of the presence of the object.

In some aspects, the V2X application 505 may modify the baseline range value based at least in part on a type of vehicle maneuver to be performed by a vehicle associated with the V2X UE. A type of vehicle maneuver may include, for example, passing, merging, navigating a curvature, caravanning, or the like. For example, if a road curvature is detected that requires the vehicle to reduce speed from 65 mph to 35 mph to navigate the curvature, the V2X application 505 may determine the range parameter based at least in part on an acceptable or comfortable deceleration rate and a distance to the road curvature. In this case, the determination of the range parameter may be based at least in part on a geometry of the road curvature, characteristics of the vehicle, preferences of an operator of the vehicle, applicable regulations, weather conditions, and/or the like. In some aspects, the V2X application 505 may modify the baseline range value based at least in part on a distance associated with the vehicle maneuver. For example, the V2X application 505 may determine a shorter-range parameter if the V2X transmitter UE is located at a larger distance from a start or a midpoint of the vehicle maneuver, and may determine a longer-range parameter if the V2X transmitter UE is located at a short distance from the start or the midpoint of the vehicle maneuver, so that the receiver UE at the appropriate distance from the curvature can obtain the information.

As shown by reference number 530, in some aspects, the V2X application may determine an asymmetric range parameter. "Asymmetric range parameter" may refer to a range parameter that includes an area that is asymmetric, relative to a location of the V2X UE, across at least one axis. For example, the range parameter may define a circular area that is not centered on the V2X UE. As another example, the range parameter may define an elliptical area that is centered on the V2X UE on a major axis of the elliptical area, and that is not centered on the V2X UE on a minor axis of the elliptical area. As another example, the range parameter may define an elliptical area that is centered on the V2X UE on the major axis and on the minor axis of the elliptical area. As yet another example, the range parameter may define an irregular shape.

In some aspects, the asymmetric range parameter may be based at least in part on a zone associated with the UE. For example, the V2X application 505 may modify a V2X zone identifier to be different from an actual V2X zone in which the V2X UE is located. A V2X zone identifier is a value included in a sidelink control information message (such as a second stage sidelink control information message) that provides an indication of the UE's location. A zone size for a zone may be configurable per communication range and resource pool. Thus, a circular (or non-circular) range can be defined relative to the modified zone identifier. As an example, if the V2X application 505 modifies the zone identifier to be located east of an actual V2X zone of the V2X UE, then receiver UEs that are located further east of the V2X UE may be within the range of communication relative to a range centered on the V2X UE, whereas a receiver UE located west of the V2X UE is less likely to be within the range than if the range is centered on the V2X UE. This approach may involve less modification of SCI than a modified range parameter.

In some aspects, the asymmetric range parameter may explicitly indicate an asymmetric range. For example, a range value (e.g., a minimum communication range (MCR) value) carried in SCI may be modified to include a plurality of values. For example, the plurality of values may define a major axis and a minor axis of an ellipse centered on the V2X UE, a major axis and a minor axis of an ellipse centered at a offset from the V2X UE that is specified by the plurality of values, may define a plurality of ranges that cumulatively define an irregular shape of the range, and/or the like. Explicitly indicating an asymmetric range may provide increased flexibility in shape and range of the asymmetric range, relative to modifying the zone identifier of the UE.

As shown by reference number 535, the V2X application 505 may provide, to the PHY/MAC layer 510, the range parameter determined in connection with reference numbers 515 and/or 530. As shown by reference number 540, the PHY/MAC layer 510 may transmit a communication according to the range parameter. For example, the PHY/MAC layer 510 may transmit SCI 545 indicating the range parameter (e.g., an MCR value with one or more values defining the range parameter), and may transmit a V2X communication 550 in association with the SCI 545. As shown by reference number 555, the recipient UE may receive the V2X communication 550 in accordance with the range parameter specified by the SCI 545. For example, if the recipient UE is within the range specified by the range parameter, then the recipient UE may honor a QoS for the V2X communication 550 indicated by the SCI 545, and if the recipient UE is outside of the range specified by the range parameter, the recipient UE may treat the V2X communication 550 as a best-effort communication, e.g. not participate in the HARQ feedback operation.

As indicated above, FIG. 5 is provided as an example. Other examples may differ from what is provided with regard to FIG. 5.

Figure 6:
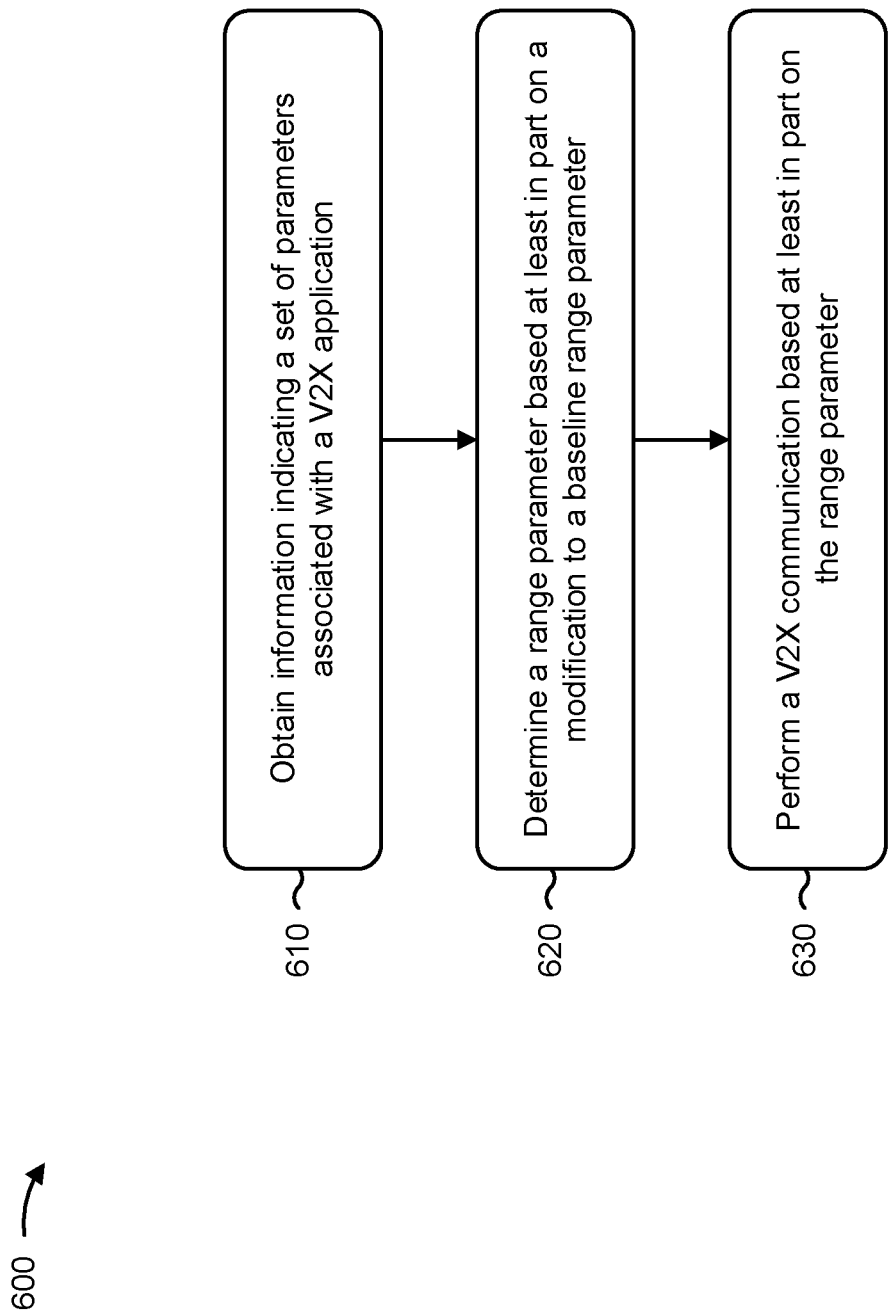
FIGS. 6-7 are diagrams illustrating example processes associated with V2X application determination of a range parameter, in accordance with the present disclosure.

FIG. 6 is a diagram illustrating an example process 600 performed, for example, by a UE, in accordance with the present disclosure. Example process 600 is an example where an apparatus of the UE (e.g., UE 120, UE 305, UE 405, the V2X UE of FIG. 5, and/or the like) performs operations associated with application based range management for V2X communication.

As shown in FIG. 6, in some aspects, process 600 may include obtaining information indicating a set of parameters associated with a V2X application (block 610). For example, the apparatus (e.g., controller/processor 280, transmit processor 264, TX MIMO processor 266, MOD 254, antenna 252, and/or the like) may obtain (e.g., receive, retrieve) information indicating a set of parameters associated with a V2X application.

As shown in FIG. 6, in some aspects, process 600 may include determining a range parameter based at least in part on a modification to a baseline range parameter (block 620). For example, the apparatus (e.g., controller/processor 280, transmit processor 264, TX MIMO processor 266, MOD 254, antenna 252, and/or the like) may determine a range parameter, as described above. "Range parameter" may be used interchangeably with "range value" in some cases. The range parameter may be based at least in part on a modification to a baseline range parameter. For example, the modification may be based at least in part on the set of parameters associated with the V2X application. The baseline range parameter may be associated with a service type of the V2X application.

As further shown in FIG. 6, in some aspects, process 600 may include performing a V2X communication based at least in part on the range parameter (block 630). For example, the UE (e.g., using controller/processor 280, transmit processor 264, TX MIMO processor 266, MOD 254, antenna 252, and/or the like) may perform the V2X communication based at least in part on the range parameter, as described above.

Process 600 may include additional aspects, such as any single aspect or any combination of aspects described below and/or in connection with one or more other processes described elsewhere herein.

In a first aspect, the baseline range parameter is associated with a coordinated driving service.

In a second aspect, alone or in combination with the first aspects, the baseline range parameter is associated with a sensor sharing service.

In a third aspect, alone or in combination with one or more of the first through second aspects, the baseline range parameter is a first baseline range parameter associated with a first service, and a second service is associated with a second baseline range parameter.

In a fourth aspect, alone or in combination with one or more of the first through third aspects, the set of parameters indicates a coordinated operation service type for the V2X communication, and the range parameter is based at least in part on the coordinated operation service type.

In a fifth aspect, alone or in combination with one or more of the first through fourth aspects, the set of parameters indicates an environment type relating to an operating environment associated with the V2X communication, and the range parameter is based at least in part on the environment type.

In a sixth aspect, alone or in combination with one or more of the first through fifth aspects, the set of parameters indicates a vehicle speed associated with a vehicle associated with the UE, and the range parameter is based at least in part on the vehicle speed.

In a seventh aspect, alone or in combination with one or more of the first through sixth aspects, the set of parameters indicates a speed limit of a road associated with the V2X communication, and the range parameter is based at least in part on the speed limit.

In an eighth aspect, alone or in combination with one or more of the first through seventh aspects, the set of parameters indicates a content type with the V2X communication, and the range parameter is based at least in part on the content type.

In a ninth aspect, alone or in combination with one or more of the first through eighth aspects, the set of parameters indicates a type of a vehicle maneuver associated with the V2X communication, and the range parameter is based at least in part on the type of the vehicle maneuver.

In a tenth aspect, alone or in combination with one or more of the first through ninth aspects, the set of parameters indicate a distance associated with the vehicle maneuver, and the range parameter is based at least in part on the distance.

In an eleventh aspect, alone or in combination with one or more of the first through tenth aspects, the determination is performed by the V2X application.

In a twelfth aspect, alone or in combination with one or more of the first through eleventh aspects, the set of parameters does not include a service type of the V2X application.

In a thirteenth aspect, alone or in combination with one or more of the first through twelfth aspects, the range parameter indicates an asymmetric range for the V2X communication based at least in part on a modified zone identifier of the UE.

In a fourteenth aspect, alone or in combination with one or more of the first through thirteenth aspects, the asymmetric range is asymmetric relative to a location of the UE.

In a fifteenth aspect, alone or in combination with one or more of the first through fourteenth aspects, the range parameter defines an asymmetric range for the V2X communication including multiple values for the range parameter.

In a sixteenth aspect, alone or in combination with one or more of the first through fifteenth aspects, the multiple values are carried in sidelink control information associated with the V2X communication.

In an eighteenth aspect, alone or in combination with one or more of the first through seventeenth aspects, the modified location identifier is a zone identifier carried in a control message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
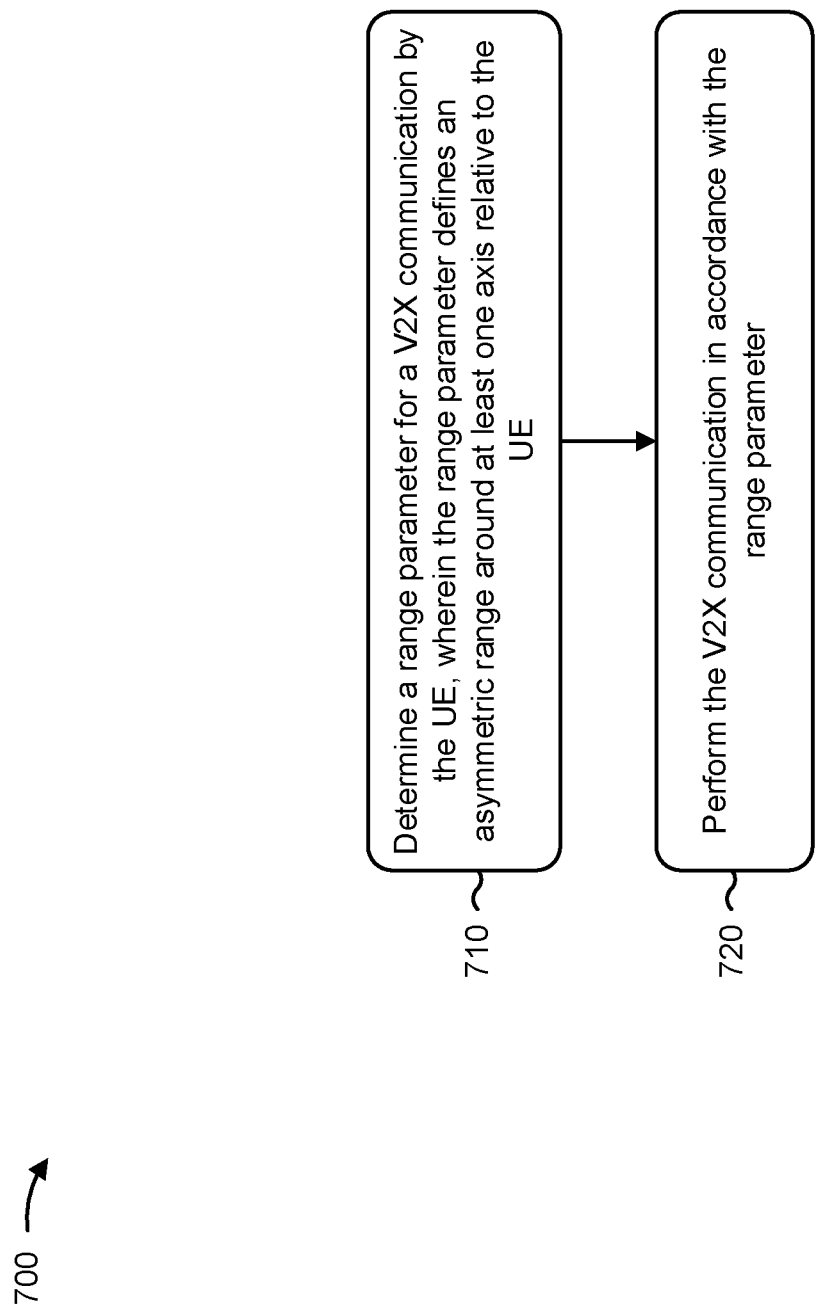

FIG. 7 is a diagram illustrating an example process 700 performed, for example, by a UE, in accordance with the present disclosure. Example process 700 is an example where the UE (e.g., UE 120, UE 305, UE 405, the V2X UE of FIG. 5, and/or the like) performs operations associated with asymmetric range management for V2X communication.

As shown in FIG. 7, in some aspects, process 700 may include determining a range parameter for a V2X communication by the UE, wherein the range parameter defines an asymmetric range around at least one axis relative to the UE (block 710). For example, the UE (e.g., using controller/processor 280, transmit processor 264, TX MIMO processor 266, MOD 254, antenna 252, and/or the like) may determine a range parameter for a V2X communication by the UE, as described above. In some aspects, the range parameter defines an asymmetric range around at least one axis relative to the UE.

As further shown in FIG. 7, in some aspects, process 700 may include performing the V2X communication in accordance with the range parameter (block 720). For example, the UE (e.g., using controller/processor 280, transmit processor 264, TX MIMO processor 266, MOD 254, antenna 252, and/or the like) may perform the V2X communication in accordance with the range parameter, as described above.

Process 700 may include additional aspects, such as any single aspect or any combination of aspects described below and/or in connection with one or more other processes described elsewhere herein.

In a first aspect, the range parameter indicates an asymmetric range for the V2X communication based at least in part on a modified zone identifier of the UE.

In a second aspect, alone or in combination with the first aspect, the range parameter defines the asymmetric range for the V2X communication using multiple values.

In a third aspect, alone or in combination with one or more of the first and second aspects, the multiple values are carried in sidelink control information associated with the V2X communication.

In a fourth aspect, alone or in combination with one or more of the first through third aspects, the multiple values indicate sizes of the asymmetric range in two or more different directions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by an apparatus of a user equipment (UE), comprising: obtaining information indicating a set of parameters associated with a vehicle-to-anything (V2X) application, the set of parameters including at least a vehicle speed associated with the UE and a service type associated with the V2X application; and performing a V2X communication based at least in part on a range parameter for the V2X communication, wherein the range parameter is based at least in part on the set of parameters.

Aspect 2: The method of Aspect 1, further comprising: determining the range parameter based at least in part on a modification to a baseline range parameter, wherein the modification is based at least in part on the set of parameters associated with the V2X application, and wherein the baseline range parameter is associated with the service type of the V2X application.

Aspect 3: The method of Aspect 2, wherein the service type is associated with a coordinated driving service.

Aspect 4: The method of Aspect 2, wherein the service type is associated with a sensor sharing service.

Aspect 5: The method of Aspect 2, wherein the baseline range parameter is a first baseline range parameter associated with a first service type, and wherein a second service type is associated with a second baseline range parameter.

Aspect 6: The method of any of Aspects 1-5, wherein the service type is a coordinated operation service type for the V2X communication, and wherein the range parameter is based at least in part on the coordinated operation service type.

Aspect 7: The method of any of Aspects 1-6, wherein the set of parameters indicates an environment type relating to an operating environment associated with the V2X communication, and wherein the range parameter is based at least in part on the environment type.

Aspect 8: The method of any of Aspects 1-7, wherein the set of parameters indicates a speed limit of a road associated with the V2X communication, and wherein the range parameter is based at least in part on the speed limit.

Aspect 9: The method of any of Aspects 1-8, wherein the set of parameters indicates a content type with the V2X communication, and wherein the range parameter is based at least in part on the content type.

Aspect 10: The method of any of Aspects 1-9, wherein the set of parameters indicates a vehicle maneuver associated with the V2X communication, and wherein the range parameter is based at least in part on the vehicle maneuver.

Aspect 11: The method of Aspect 10, wherein the set of parameters indicates a distance associated with the vehicle maneuver, and wherein the range parameter is based at least in part on the distance.

Aspect 12: The method of any of Aspects 1-11, wherein the range parameter is determined by the V2X application.

Aspect 13: The method of any of Aspects 1-12, wherein the range parameter indicates an asymmetric range for the V2X communication based at least in part on a modified location identifier of the UE.

Aspect 14: The method of Aspect 13, wherein the asymmetric range is asymmetric relative to a location of the UE.

Aspect 15: The method of Aspect 13, wherein the modified location identifier is a zone identifier carried in a control message.

Aspect 16: The method of any of Aspects 1-15, wherein the range parameter defines an asymmetric range for the V2X communication including multiple values for the range parameter.

Aspect 17: The method of Aspect 16, wherein the multiple values are carried in sidelink control information associated with the V2X communication.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      obtain information indicating a set of parameters associated with a vehicle-to-anything (V2X) application;
      determine a range parameter based at least in part on a modification to a baseline range parameter, wherein the modification is based at least in part on the set of parameters associated with the V2X application, and wherein the baseline range parameter is based at least in part on a service type, of a plurality of service types, of the V2X application; and
      perform a V2X communication based at least in part on the range parameter.

2. The apparatus of claim 1, wherein the range parameter indicates an asymmetric range for the V2X communication based at least in part on a modified location identifier of the UE.

3. The apparatus of claim 2, wherein the asymmetric range is asymmetric relative to a location of the UE.

4. The apparatus of claim 2, wherein the modified location identifier is a zone identifier carried in a control message.

5. The apparatus of claim 1, wherein the range parameter defines an asymmetric range for the V2X communication including multiple values for the range parameter for different directions.

6. The apparatus of claim 5, wherein the multiple values are carried in sidelink control information associated with the V2X communication.

7. The apparatus of claim 1, wherein the service type is associated with at least one of:
   a coordinated driving service,
   a sensor sharing service, or
   a coordinated operation service type for the V2X communication.

8. The apparatus of claim 1, wherein the baseline range parameter is a first baseline range parameter associated with a first service type, and wherein a second service type is associated with a second baseline range parameter.

9. The apparatus of claim 1, wherein the set of parameters indicates an environment type relating to an operating environment associated with the V2X communication, and wherein the range parameter is based at least in part on the environment type.

10. The apparatus of claim 1, wherein the set of parameters indicates a vehicle speed associated with a vehicle associated with the UE, wherein the range parameter is based at least in part on the vehicle speed.

11. The apparatus of claim 1, wherein the set of parameters indicates a speed limit of a road associated with the V2X communication, and wherein the range parameter is based at least in part on the speed limit.

12. The apparatus of claim 1, wherein the set of parameters indicates at least one of a type of a vehicle maneuver associated with the V2X communication or a distance associated with the vehicle maneuver, and wherein the range parameter is based at least in part on the type of the vehicle maneuver or the distance associated with the vehicle maneuver.

13. A method of wireless communication performed by an apparatus of a user equipment (UE), comprising:
- obtaining information indicating a set of parameters associated with a vehicle-to-anything (V2X) application;
- determining a range parameter based at least in part on a modification to a baseline range parameter, wherein the modification is based at least in part on the set of parameters associated with the V2X application, and wherein the baseline range parameter is based at least in part on a service type, of a plurality of service types, of the V2X application; and
- performing a V2X communication based at least in part on the range parameter.

14. The method of claim 13, wherein the range parameter indicates an asymmetric range for the V2X communication based at least in part on a modified location identifier of the UE.

15. The method of claim 14, wherein the asymmetric range is asymmetric relative to a location of the UE.

16. The method of claim 14, wherein the modified location identifier is a zone identifier carried in a control message.

17. The method of claim 13, wherein the range parameter defines an asymmetric range for the V2X communication including multiple values for the range parameter for different directions.

18. The method of claim 17, wherein the multiple values are carried in sidelink control information associated with the V2X communication.

19. The method of claim 13, wherein the service type is associated with at least one of:
- a coordinated driving service,
- a sensor sharing service, or
- a coordinated operation service type for the V2X communication.

20. The method of claim 13, wherein the baseline range parameter is a first baseline range parameter associated with a first service type, and wherein a second service type is associated with a second baseline range parameter.

21. The method of claim 13, wherein the set of parameters indicates an environment type relating to an operating environment associated with the V2X communication, and wherein the range parameter is based at least in part on the environment type.

22. The method of claim 13, wherein the set of parameters indicates a vehicle speed associated with a vehicle associated with the UE, wherein the range parameter is based at least in part on the vehicle speed.

23. The method of claim 13, wherein the set of parameters indicates a speed limit of a road associated with the V2X communication, and wherein the range parameter is based at least in part on the speed limit.

24. The method of claim 13, wherein the set of parameters indicates at least one of a type of a vehicle maneuver associated with the V2X communication or a distance associated with the vehicle maneuver, and wherein the range parameter is based at least in part on the type of the vehicle maneuver or the distance associated with the vehicle maneuver.

25. The method of claim 13, wherein the range parameter is determined by the V2X application.

26. A non-transitory computer-readable medium storing one or more instructions for wireless communication that, when executed by one or more processors of a user equipment (UE), cause the one or more processors to:
- obtain information indicating a set of parameters associated with a vehicle-to-anything (V2X) application;
- determine a range parameter based at least in part on a modification to a baseline range parameter, wherein the modification is based at least in part on the set of parameters associated with the V2X application, and wherein the baseline range parameter is based at least in part on a service type, of a plurality of service types, of the V2X application; and
- perform a V2X communication based at least in part on the range parameter.

27. The non-transitory computer-readable medium of claim 26, wherein the range parameter indicates an asymmetric range for the V2X communication based at least in part on a modified location identifier of the UE.

28. The non-transitory computer-readable medium of claim 27, wherein the asymmetric range is asymmetric relative to a location of the UE.

29. An apparatus for wireless communication, comprising:
- means for obtaining information indicating a set of parameters associated with a vehicle-to-anything (V2X) application;
- means for determining a range parameter based at least in part on a modification to a baseline range parameter, wherein the modification is based at least in part on the set of parameters associated with the V2X application, and wherein the baseline range parameter is based at least in part on a service type, of a plurality of service types, of the V2X application; and
- means for performing a V2X communication based at least in part on the range parameter.

30. The apparatus of claim 29, wherein the range parameter indicates an asymmetric range for the V2X communication based at least in part on a modified location identifier of the apparatus.

* * * * *